United States Patent
Le Meur et al.

(10) Patent No.: US 9,660,715 B2
(45) Date of Patent: *May 23, 2017

(54) METHOD FOR THE DETECTION OF AN ELECTROMAGNETIC SIGNAL BY AN ANTENNA ARRAY, AND DEVICE IMPLEMENTING SAID METHOD

(71) Applicant: THALES, Courbevoie (FR)

(72) Inventors: Anne Le Meur, Elancourt (FR); Jean-Yves Delabbaye, Vieille-Eglise en Yvelines (FR); Luc Bosser, Elancourt (FR)

(73) Assignee: THALES, Courbevoie (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/912,028

(22) PCT Filed: Aug. 13, 2014

(86) PCT No.: PCT/EP2014/067292
§ 371 (c)(1),
(2) Date: Feb. 12, 2016

(87) PCT Pub. No.: WO2015/024827
PCT Pub. Date: Feb. 26, 2015

(65) Prior Publication Data
US 2016/0197664 A1    Jul. 7, 2016

(30) Foreign Application Priority Data

Aug. 23, 2013   (FR) ..................... 13 01973

(51) Int. Cl.
*H04L 27/06* (2006.01)
*H04B 7/08* (2006.01)
*H04B 1/16* (2006.01)

(52) U.S. Cl.
CPC ............. *H04B 7/0894* (2013.01); *H04B 1/16* (2013.01)

(58) Field of Classification Search
CPC ......................... H04L 25/067; H04L 1/0045
(Continued)

(56) References Cited

U.S. PATENT DOCUMENTS

| | | | |
|---|---|---|---|
| 7,637,656 B2 * | 12/2009 | Billington | G01K 7/32 374/104 |
| 2005/0259621 A1 | 11/2005 | Lee | |
| 2016/0191139 A1 * | 6/2016 | Le Meur | H04B 1/16 375/340 |

OTHER PUBLICATIONS

E. L. Lehmann et al., "Testing Statistical Hypothesis," Springer 2005, pp. 56-59.

(Continued)

*Primary Examiner* — Khai Tran
(74) *Attorney, Agent, or Firm* — Baker & Hostetler LLP

(57) ABSTRACT

A method for detecting an electromagnetic signal comprises: applying to the received electromagnetic signal a plurality of time-frequency transforms, for each time/frequency cell of a given set of cells, calculating the energy of the vector made up of the spectra over all of the antenna elements, applying the following nonlinear function T to the result of the energy calculation: if the norm of the energy is below a first predetermined threshold s, the result of the function T is zero, if the norm of the energy is above or equal to the first threshold s, the result of the function T is equal to the norm of the energy minus the value of the first threshold s, integrating, over the set of time/frequency cells, the result of the nonlinear function T, comparing the result of the integration to a second predetermined threshold, to detect the presence of the signal.

12 Claims, 5 Drawing Sheets

(58) Field of Classification Search
USPC .................. 375/340, 346, 347, 349; 374/117
See application file for complete search history.

(56) References Cited

OTHER PUBLICATIONS

Taherpour et al., "Multiple antenna spectrum sensing in cognitive radios," IEEE Transactions on Wireless communications, vol. 9, No. 2, Feb. 2010, pp. 814-823, XP011300984.

* cited by examiner

METHOD FOR THE DETECTION OF AN ELECTROMAGNETIC SIGNAL BY AN ANTENNA ARRAY, AND DEVICE IMPLEMENTING SAID METHOD

CROSS-REFERENCE TO RELATED APPLICATIONS

This application is a National Stage of International patent application PCT/EP2014/067292, filed on Aug. 13, 2014, which claims priority to foreign French patent application No. FR 1301973, filed on Aug. 23, 2013, the disclosures of which are incorporated by reference in their entirety.

FIELD OF THE INVENTION

The invention relates to the field of the detection of wireless emissions originating, notably, from radars or from telecommunication systems, and received by an antenna array with space diversity.

The invention relates more specifically to a method for detecting an electromagnetic signal by an antenna array, notably a lacunary antenna array, and a device for implementing said method.

BACKGROUND

One problem to be solved in the field of the detection of electromagnetic signals lies in the fact that the type of signal intercepted is not a priori known, particularly its frequency bandwidth, the type of modulation used or, more generally, any parameter associated with the waveform of the signal.

The known detection methods are generally constructed on the a priori knowledge of the form of the signal and use a filter adapted according to this knowledge.

However, it is not possible to implement filters adapted to all types of signals expected.

Two major types of receivers have hitherto been considered to provide a watch over a very wide frequency band: the receivers permanently covering the band to be watched, which are adapted to detect only the signals of high power, and the narrowband receivers, which do not make it possible to instantaneously cover the total band, but whose function is to detect signals of lower power and which allow for finer analyses of the signal.

The present invention falls within the scope of the narrowband receivers.

The traditional methods for detecting electromagnetic signals are notably based on the following preliminary steps.

The reception of signals is done through an antenna array with space diversity, or interferometric array, and the demodulation of the signal is performed by the same local oscillator for all the sensors of the array. The signal is then sampled, on each reception channel, in real or complex form, then one or more banks of filters are applied, for example by weighted discrete Fourier transform. In other words, a number of temporally overlapped discrete Fourier transforms are applied in order to produce an average adaptation to the band of the signals of interest. At the end of this operation, called time-frequency analysis, the signal is transformed into a time-frequency grid broken down into time-frequency cells, each cell containing the result of a discrete Fourier transform for a given time interval and a given frequency interval.

One known detection method consists in comparing the power of the signal, in each time-frequency cell, to a given detection threshold. However, this cell-by-cell decision-making is not optimal when the signal is spread in time and/or in frequency.

There is therefore a problem to be solved in adapting to the spread of the signal over a plurality of time-frequency cells.

Also known are solutions based on the formation of a single channel from the signals received by the plurality of antenna elements of the array, but these solutions are efficient only for regular arrays, in other words arrays for which the distance between two antenna elements is regular.

There is therefore also a problem to be solved in designing a detection method adapted to a lacunary array, that is to say an array for which the spacing between two elements is not regular.

SUMMARY OF THE INVENTION

The invention proposes a method and a system for detecting electromagnetic signals which does not require any a priori knowledge of the type of signal and which can be implemented through a lacunary antenna array.

The invention is suited to both antenna arrays with mono-polarization and with bipolarization.

Thus, the subject of the invention is a method for detecting an electromagnetic signal, called signal of interest, likely to be contained in an electromagnetic signal received by an antenna array comprising a plurality of antenna elements, said method comprising the following steps:

applying to said electromagnetic signal received by each antenna element a plurality of time-frequency transforms in order to obtain a representation of said signal in the form of a plurality of time-frequency cells each containing the spectrum of said signal for a given frequency interval and a given time interval, for each time/frequency cell of a given set of cells,
calculating the energy of the vector made up of the spectra over all of the antenna elements,
applying the following nonlinear function T to the result of the preceding energy calculation, so as to cancel the time/frequency cells containing substantially only noise:
if the norm of the energy of the vector of the spectra is below a first predetermined threshold s, the result of the function T is zero,
if the norm of the energy of the vector of the spectra is above or equal to said first threshold s, the result of the function T is equal to the norm of the energy of the vector of the spectra minus the value of said first threshold s,
integrating, over said set of time/frequency cells, the result of said nonlinear function T,
comparing the result of the integration to a second predetermined threshold, called detection threshold $S_{det}$, to detect the presence of the signal of interest.

According to a particular aspect of the invention, said antenna elements are mono-polarized.

According to another particular aspect of the invention, said antenna elements are bipolarized.

In the case where said antenna elements are bipolarized, the energy calculation step can be performed on the vector made up of the spectra for each of the polarizations over all of the antenna elements.

In the case where said antenna elements are bipolarized, the method according to the invention can further comprise the following steps:

calculating the covariance matrix between the plurality of spectra associated with the plurality of antenna elements configured according to a first polarization and the plurality of spectra associated with the plurality of antenna elements configured according to a second polarization, calculating the eigenvector associated with the greatest eigenvalue of said covariance matrix, in the energy calculation step, replacing the spectrum with its scalar product with said eigenvector.

In the case where said antenna elements are bipolarized, the steps of calculation of the energy of the spectra, of application of the nonlinear function T and of integration, over a plurality of time/frequency cells, of the result of said nonlinear function T, can be performed separately for each polarization of said antenna elements, said method further comprising an additional step of determination of the maximum of the results of integration over the two polarizations, said maximum being compared to said second detection threshold.

According to another particular aspect of the invention, said first threshold s is determined by searching for the intersection between the x-axis and the asymptote at infinity of the logarithm of the likelihood ratio defined as the quotient of the probability densities in the hypothesis in which the signal of interest is present in a time/frequency cell and in the hypothesis in which the signal of interest is absent in a time/frequency cell.

The first threshold s can be calculated as a function of a given signal-to-noise ratio and of a parameter q representative of the probability of presence of the signal of interest in a time/frequency cell.

Said parameter q can be chosen from a range lying between 0.1 and 1.

According to another particular aspect of the invention, said second detection threshold $S_{det}$ is configured to observe a given probability of false alarm.

According to another particular aspect of the invention, said antenna array is lacunary.

Another subject of the invention is a device for the detection of an electromagnetic signal, called signal of interest, likely to be contained in an electromagnetic signal, said device comprising an antenna array formed by a plurality of antenna elements and means configured to implement the method according to the invention.

BRIEF DESCRIPTION OF THE DRAWINGS

Other features and advantages of the present invention will become more apparent on reading the following description in relation to the attached drawings which represent.

DETAILED DESCRIPTION

Detection on Antenna Array with Mono-Polarization

Figure 1:
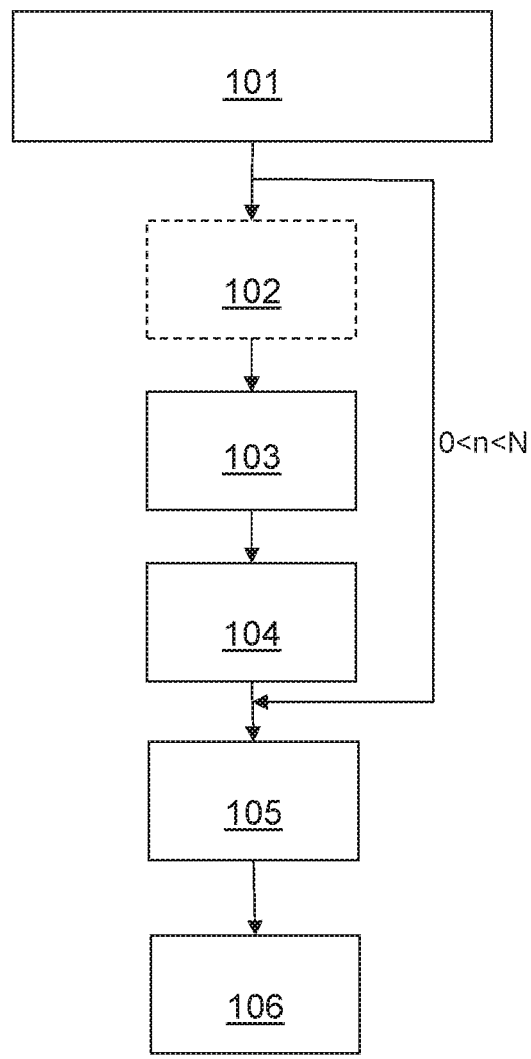
FIG. 1, a flow diagram of the steps of implementation of the method for detecting electromagnetic signals according to the invention, FIG. 2a, a block diagram of a device for the detection of electromagnetic signals for a mono-polarized lacunary array according to a first embodiment, FIG. 2b, a block diagram of a device for the detection of electromagnetic signals for a mono-polarized lacunary array, according to a variant of the first embodiment, FIG. 3a, a block diagram of a device for the detection of electromagnetic signals for a bipolarized lacunary array, according to a first and a second embodiment, FIG. 3b, a block diagram of a device for the detection of electromagnetic signals for a bipolarized lacunary array, according to a third embodiment.

The invention is now described according to a first embodiment which relates antenna arrays with mono-polarization, in other words, the arrays which are made up of antenna elements polarized according to a single polarization.

The method according to the invention uses the outputs of the time-frequency analysis processing, in other words the time-frequency cells, to decide on the presence or the absence of a signal, in the presence of thermal noise which is modeled as a centered complex random Gaussian signal of symmetrical spectral density $N_0/2$ for each of its real and imaginary components which are mutually independent.

To construct the detector, the statistical decision theory is used, described notably in the work "Testing Statistical Hypothesis, E. L. Lehmann, J. P. Romano, Springer 2005" which amounts to testing the validity of one of the two models of the signal received, in other words the presence, denoted $H_1$, or the absence, denoted $H_0$, of the useful signal, so as to optimize the Neyman-Pearson criterion which consists in maximizing the probability of detection, subject to the constraint that the probability of false alarm is fixed.

For a given discrete Fourier transform size, the hypothesis $H_1$ will be tested against $H_0$ in a time-frequency window made up of the outputs of several consecutive discrete Fourier transforms limited to a given band and to a given time interval.

The outputs in "time" and in "frequency" extend vectorially, each of the components originating from one of the P sensors of the antenna array.

To avoid unnecessarily complicating the notations, the duly formed "time-frequency" cell will be designated by the index n. Since the useful signal is narrowband, it is always written vectorially in the following form for the cell n: $Us_n$ in which $s_n$ is the component of the demodulated useful signal, in other words its complex envelope, projected by virtue of the discrete Fourier transform operation. U is a fixed vector for the same threat whose components reflect the interferometric phase shifts for an interferometric antenna array.

To complete the modeling of the useful signal, information has to be given on $s_n$, and that represents a difficulty since, in the listening domain, the signal is by definition unknown. Now, it is precisely by exploiting a realistic model that it is possible to make progress in efficiency. Given the filtering effects, after the discrete Fourier transforms, the useful signal present in the time-frequency cell n, $s_n$, is modeled by a sample of a centered complex random Gaussian variable with independent components of common variance $\sigma'^2$. Moreover, the different values of $s_n$ are considered as independent. This all reflects a model with little constraint which makes no assumption of phase or amplitude continuity so as to be valid for all the possible modulations.

The following model is obtained for the received signal in the case where the useful signal is present ($H_1$) and where it is absent ($H_0$):

$$\begin{cases} H_1: & X_n = Us_n + W_n \\ H_0: & X_n = W_n \end{cases}; n = 1, 2, \ldots N.$$

in which $W_n$ is the digital white noise of covariance matrix $2\sigma^2 I$ with I being the identity matrix of size P×P. It is assumed that the power of the noise $2\sigma^2$ is known or can be estimated elsewhere. With no loss of generality, it will always be assumed hereinbelow that U is normed, which amounts to changing the value of $\sigma'^2$ as required.

To complete the above model, in the hypothesis $H_1$, it will be added that $s_n$ is present in the above form with the probability q and absent with the probability 1−q, and in a way that is independent of n.

This model involves unknown parameters: the directions $(\theta,\phi)$ in U, $\sigma'^2$,q.

In $H_1$, conditionally on the directions $(\theta,\phi)$, and on the fact that $s_n$ is different from zero.

$E(X_n X^*_n|U) = 2\sigma'^2 UU^* + 2\sigma^2 I$ in which I denotes the identity matrix of dimension P×P in which P is the number of antennas, and in which the notation X* denotes the conjugate transpose of X.

If all of the directions of arrivals of the targets are considered (which amounts to saying that the aim is to make a good on average detector for all the directions of arrival of the targets), the average of the terms UU* is proportional to I.

The non-conditional covariance is deduced therefrom in $H_1$: $E(X_n X^*_n) = (2\sigma'^2 + 2\sigma^2)I$. The term $2\sigma'^2$ "absorbs" the coefficient of proportionality between UU* and I: to avoid complicating the notations, the term $2\sigma'^2$ is retained rather than introducing a term $2\sigma''^2$.

And, in $H_0$, $E(X_n X^*_n) = 2\sigma^2 I$

In the hypothesis $H_1$, the sample $X_n$ has the probability density $$p_1(X_n) = \frac{q}{\pi^P(2(\sigma'^2+\sigma^2))^P} \cdot \exp\left(\frac{-X_n^* X_n}{2(\sigma'^2+\sigma^2)}\right) + \frac{1-q}{\pi^P(2\sigma^2)^P} \left(\frac{-X_n^* X_n}{2\sigma^2}\right)$$

The probability density of the measurement $X_n$ in the hypothesis in which there is absence of signal is:

$$p_0(X_n) = \frac{1}{\pi^P(2\sigma^2)^P} \cdot \exp\left(\frac{-X_n^* X_n}{2\sigma^2}\right)$$

The likelihood ratio $L(X_n)$ is the quotient of the probability densities in the hypotheses $H_1$ and $H_0$.

$$L(X_n) = \frac{p_1(X_n)}{p_0(X_n)} = \frac{q \cdot \sigma^{2P}}{(\sigma'^2+\sigma^2)^P} \cdot \exp\left(\frac{\sigma'^2 X_n^* X_n}{2\sigma^2(\sigma'^2 \sigma^2)}\right) + (1-q)$$

To determine the detection test according to the invention, the logarithm of the likelihood ratio is calculated for all the measurements $X_n$; n=1, 2, ..., N:

$$L(X_1, X_2, \ldots, X_N; q, \sigma'^2) =$$

$$\sum_{n=1}^{N} \ln p(q, X_n) - \ln p(0, X_n) = \sum_{n=1}^{N} \ln(q \cdot a^P \cdot \exp(bX_n^* X_n) + (1-q)) \text{ with}$$

$$a = \frac{\sigma^2}{(\sigma'^2+\sigma^2)} \text{ and } b = \frac{\sigma'^2}{2 \cdot \sigma^2(\sigma'^2+\sigma^2)}$$

by using the independence of the measurements Xn.

As this function depends on two unknown parameters q and $\sigma'^2$, it is not possible to use it as such in the detection between "simple hypotheses". According to the invention, the operation of the detector is then optimized in the vicinity of the signal-to-noise ratio K; which amounts to setting $\sigma'^2 = K \sigma^2$. As for the parameter q, it can be set if there is an average idea of the time-frequency occupancy of the useful signal in the detection window.

The comparison of the likelihood ratio $L(X_1, X_2, \ldots, X_N; q, \sigma'^2)$ to a threshold (optimal detector in the sense of the Neyman-Pearson criterion for the values of q and $\sigma'^2$ chosen), is equivalent to comparing the function Tq to a threshold:

$$\sum_{n=1}^{N} T_q(X_n^* X_n) = \sum_{n=1}^{N} \alpha L_n(X_n^* X_n) + \beta$$

in which $\alpha>0$ and $\beta$ real.

The aim is to have the asymptotic behavior of the detector be that of the quadratic detector, which is reflected by the relationship $$\lim_{\|X_n\|^2 \to \infty} \frac{T_q(X_n^* X_n)}{X_n^* X_n} = 1.$$

Furthermore, the aim is that, regardless of q, Tq(0)=0 (which means that when the measured signal is zero, the criterion must be zero).

To satisfy these constraints, it is essential to choose:
$\alpha = 1/b$ and $\beta = -\alpha \cdot \ln(q \cdot \alpha^P + 1 - q)$ The function $T_q$ is therefore written:

$$T_q(X_n^* X_n) = \frac{1}{b} \cdot \ln\frac{q \cdot a^P \cdot \exp(bX_n^* X_n) + (1-q)}{q \cdot a^P + 1 - q} \quad (1)$$

The function $T_q$ is a positive function defined on the positive real numbers.

When q<1, $T_q(u)$ tends toward 0 when u tends toward 0, and has for asymptote the straight line $u-u_0$ when u tends toward +∞, with $$u_0 = -\frac{1}{b} \ln \frac{q \cdot a^P}{q \cdot a^P + 1 - q}. \quad (2)$$

For q=1, exactly $T_q(u)=u$ is found.

It is possible to liken the behavior of $T_q$ to two straight lines (the asymptote of $T_q$ as infinity, and the x-axis), and to retain only this behavior to define the detector h according to the invention, which amounts to performing:

$\Sigma_{n=1}^{N} h(\|X_n\|^2) >$ or $<$threshold in which (u)=0 for $0 \le u \le u_0$ and $h(u) = u - u_0$ for $u > u_0$, with $u_0 > 0$ for q<1 and $u_0 = 0$ for q=1.

This detector is therefore made up of a spatially incoherent integration $(\|X_n\|^2)$, followed by a nonlinearity (function h) then by an incoherent integration over a time/frequency window $(\Sigma_{n=1}^{N})$.

Detection on Antenna Array with Bipolarization

The invention is now described according to a second embodiment which relates to the antenna arrays with bipolarization, in other words, the arrays which are made up of antenna elements polarized according to two different polarizations.

For an antenna with bipolarization, the signal at the discrete Fourier transform output is modeled as follows.

After spectral analysis, the signal measured in the time-frequency cell of index n is written, in the hypothesis $H_1$ (that is to say the hypothesis in which the signal is present in the cell):

$$H_1: \begin{cases} z_{1n} = g_1 \cdot s_n + w_{1n} \\ z_{2n} = g_2 \cdot s_n + w_{2n} \end{cases} n = 1, 2, \ldots N$$

$g_1$ and $g_2$ are the complex gains of the two antennas, which depend on the polarization.

The signal $s_n$ is zero with the probability $1-q$ and different from 0 with the probability $q$. $s_n$ is a sample of a centered complex Gaussian variable of variance $2\sigma'^2$. The samples $s_n$ are independent from one time-frequency cell to another.

With $2\sigma'^2$ being the total power of the useful signal, it is assumed, without loss of generality, that $|g_1|^2+|g_2|^2=1$ (usually $g_1=\cos(\alpha)$ and $g_2=\sin(\alpha)e^{i\psi}$ are assumed).

$w_{1n}$, $w_{2n}$ are centered complex Gaussian noises of the same variance $2\sigma^2$, independent at n and mutually independent.

When the signal is absent, the following model $H_0$ applies:

$$H_0: \begin{cases} z_{1n} = w_{1n} \\ z_{2n} = w_{2n} \end{cases} n = 1, 2, \ldots N$$

When $s_n$ is different from 0, $(z_{1n}, z_{2n}) = z_n^T$ is a centered complex Gaussian vector of covariance:

$$R = \begin{pmatrix} |g_1|^2 \cdot 2\sigma'^2 + 2\sigma^2 & 2g_1\overline{g_2}\sigma'^2 \\ 2\overline{g_1}g_2\sigma'^2 & |g_2|^2 2\sigma'^2 + 2\sigma^2 \end{pmatrix}$$

Hereinbelow, G is used to denote the vector $(g_1\ g_2)^T$ such that $$R = 2\sigma'^2 GG^* + 2\sigma^2 I$$

For an antenna array comprising P antenna elements with bipolarization, the following models are deduced therefrom.

When the signal is present, the model $H_1$ applies:

$$H_1: \begin{cases} z_{1pn} = g_1 \cdot e^{i\varphi_p} s_n + w_{1pn} \\ z_{2pn} = g_2 \cdot e^{i\varphi_p} s_n + w_{2pn} \end{cases} n = 1, 2, \ldots N$$

in which $\phi_p$ represents the geometrical phase shift of the antenna p relative to a point chosen as reference.

When the signal is absent, the model $H_0$ applies:

$$H_0: \begin{cases} z_{1pn} = w_{1pn} \\ z_{2pn} = w_{2pn} \end{cases} n = 1, 2, \ldots N$$

The following notations are now used:

$z_{p_n}$ the measurement n made on the antenna p: $z_{p_n} = (z_{1pn}, z_{2pn})^T$ $z_n$ all of the measurements of index n made on all of the P antennas: $z = (z_{11n}, z_{21n}, \ldots, z_{1pn}, z_{2pn})^T$ when $s_n \neq 0$, $z_{p_n}$ is a centered complex Gaussian vector of covariance:

$$R = \begin{pmatrix} |g_1|^2 \cdot 2\sigma'^2 + 2\sigma^2 & 2g_1\overline{g_2}\sigma'^2 \\ 2\overline{g_1}g_2\sigma'^2 & |g_2|^2 2\sigma'^2 + 2\sigma^2 \end{pmatrix}$$

For P antennas with bipolarization, if the measurements are assumed independent from one antenna with bipolarization to another (which amounts to making a good on average detector in all the directions of arrival and abandoning making a detection optimized as a function of a given direction of arrival), then, in the hypothesis $H_1$, the measurement vector $(z_{11n}, z_{21n}, \ldots, z_{1Pn}, z_{2Pn})^T$ has the following non-conditioned covariance matrix:

$$\mathfrak{R} = \begin{pmatrix} R & & & & \\ & R & & & \\ & & \ldots & & \\ & & & R & \\ & & & & R \end{pmatrix}$$

This is a diagonal block matrix; it therefore has the following properties:

$$\det \mathfrak{R} = (\det R)^P$$

$$\mathfrak{R}^{-1} = \begin{pmatrix} R^{-1} & & & & \\ & R^{-1} & & & \\ & & \ldots & & \\ & & & R^{-1} & \\ & & & & R^{-1} \end{pmatrix}$$

There now follows a description of the detector implemented, according to the invention, for an antenna array comprising P elements with bipolarization. The invention applies notably for lacunary arrays with bipolarization in which the phase centers of the reception channels of the two polarizations of one and the same antenna coincide.

In the hypothesis $H_0$, the complex signal z has the probability density:

$$p_0(z_n) = \frac{1}{\pi^{2P}(2\sigma^2)^{2P}} \exp\left(-\frac{\|z_n\|^2}{2\sigma^2}\right)$$

In the hypothesis $H_1$, the complex signal $z_n$ has the probability density:

$$p_1(z_n) = \frac{q}{\pi^{2P}\det\mathfrak{R}} \exp(-z_n^* \mathfrak{R}^{-1} z_n) + \frac{1-q}{\pi^{2P}(2\sigma^2)^{2P}} \exp\left(-\frac{\|z_n\|^2}{2\sigma^2}\right)$$

$$= \frac{q}{\pi^{2P}(\det R)^P} \exp\left(-\sum_{p=1}^{P} z_{pn}^* R^{-1} z_{pn}\right) + \frac{1-q}{\pi^{2P}(2\sigma^2)^{2P}} \exp\left(-\frac{\|z_n\|^2}{2\sigma^2}\right)$$

After calculations, the following is obtained:

$$R^{-1} = \frac{1}{2\sigma^2} I - \frac{2\sigma'^2 \|G\|^2}{2\sigma^2(2\sigma'^2\|G\|^2 + 2\sigma^2)} \Gamma\Gamma^*, \text{ in which } \Gamma = G/\|G\|$$

From the above equations, the likelihood ratio is deduced:

$$L_n: L_n = \frac{p_1(z_n)}{p_0(z_n)} = \frac{q(2\sigma^2)^{2P}}{(\det R)^P} \exp\left(\frac{2\sigma'^2\|G\|^2}{2\sigma^2(2\sigma'^2\|G\|^2 + 2\sigma^2)} \sum_{p=1}^{P} |\Gamma^* z_{pn}|^2\right) + 1 - q$$

The optimal detector in the sense of the Neyman-Pearson criterion (for the values of q and $\sigma'^2$ chosen) is equivalent to comparing the function $\ln L(z_1, z_2, \ldots z_N; q, \sigma'^2, \Gamma) = \Sigma_{n=1}^{N} \ln p_1(z_n) - \ln p_0(z_n)$, to a threshold, with said function depending on three unknown parameters: $\Gamma$, $\sigma'^2$ and q, in which $\sigma'^2$ is the power of the useful signal, q is the proportion of useful signal within the window analyzed, and $\Gamma$ is the eigenvector of R associated with the greatest eigenvalue of R.

In effect $R = 2\sigma'^2 GG^* + 2\sigma^2 I$, therefore: $R \cdot G = (2\sigma'^2\|G\|^2 + 2\sigma^2)G$, G, and also $\Gamma = G/\|G\|$, are therefore eigenvectors of the matrix R associated with the eigenvalue $2\sigma'^2\|G\|^2 + 2\sigma^2$.

The second eigenvalue of R has the value $\text{tr}R - (2\sigma'^2\|G\|^2 + 2\sigma^2) = 2\sigma^2$.

$\Gamma$ is therefore a eigenvector of R associated with the greatest eigenvalue of R.

In the case where q=1, $L(z_n; q, \sigma'^2, \Gamma)$ is simplified to:

$$L(z_n; \sigma'^2, \Gamma) = \frac{(2\sigma^2)^{2P}}{(\det R)^P} \exp\left(\frac{2\sigma'^2\|G\|^2}{2\sigma^2(2\sigma'^2 + 2\sigma^2)} \sum_{p=1}^{P} |\Gamma^* z_{pn}|^2\right),$$

that can be put in the form:

$$g_{\sigma,\sigma'}\left(\sum_{p=1}^{P} |\Gamma^* z_{pn}|^2\right)$$

in which $g_{\sigma,\sigma'}(.)$ is the function defined by $$g_{\sigma,\sigma'}(u) = \frac{(2\sigma^2)^{2P}}{(\det R)^P} \exp\left(\frac{2\sigma'^2\|G\|^2 u}{2\sigma^2(2\sigma'^2 + 2\sigma^2)}\right)$$

which is increasing monotone.

Consequently, the family $p_1(z_n)$, indexed by $\sigma'$, is a function with monotone likelihood ratio for the function $$\left(\sum_{p=1}^{P} |\Gamma^* z_{pn}|^2\right).$$

Therefore the test $$\left(\sum_{p=1}^{P} |\Gamma^* z_{pn}|^2\right)$$

above or below a threshold is a Uniformly Most Powerful (UMP) test, known in the field for example form the work "Testing Statistical Hypothesis", E. L. Lehmann, J. P. Romano, Springer 2005. That means that, whatever the value of the unknown parameter a', and for a set probability of false alarm, the test has a probability of detection (power of the test) greater than that of any other test.

When there are N measurements available, the test becomes:

$$\sum_{n=1}^{N} \left(\sum_{p=1}^{P} |\Gamma^* z_{pn}|^2\right)$$

above or below a threshold.

$\Gamma$ being unknown, it must be estimated.

Since q=1, it is possible to analytically calculate the estimate of $\Gamma$ in the sense of the likelihood maximum, $\hat{\Gamma}_{MV}$.

$\hat{\Gamma}_{MV}$ is the value of $\Gamma$ which maximizes $$\prod_{n=1}^{N} L(z_n).$$

Now, when q=1, $$\prod_{n=1}^{N} L(z_n)$$

is equal to $$\exp\left(\sum_{n=1}^{N} \sum_{p=1}^{P} |\Gamma^* z_n|^2\right),$$

to within a multiplying term close to $$\left(\frac{4\sigma^4}{\det R}\right)^P = \left(\frac{2\sigma^2}{2\sigma'^2\|G\|^2 + 2\sigma^2}\right)^P,$$

which is independent of $\Gamma$ because $\|G\|=1$.

Therefore:

$$\prod_{n=1}^{N} L(z_n) \text{ maximum} <=> \sum_{n=1}^{N} \sum_{p=1}^{P} |\Gamma^* z_{pn}|^2 \text{ maximum} <=>$$

$$\sum_{n=1}^{N} \sum_{p=1}^{P} \Gamma^* z_{pn} z_{pn}^* \Gamma \text{ maximum} <=> \Gamma^*\left(\sum_{n=1}^{N} \sum_{p=1}^{P} z_{pn} z_{pn}^*\right)\Gamma \text{ maximum}$$

$<=> \Gamma^* \hat{R} \Gamma$ maximum in which R is the empirical covariance matrix of the measurements.

This amounts to maximizing the quantity $Z = \Gamma^* \hat{R} \Gamma - \lambda (\Gamma^*\Gamma - 1)$, because $\Gamma$ is normalized.

By deriving Z relative to $\Gamma^*$, the following is obtained: $\partial Z/\partial \Gamma^* = -\lambda \Gamma = 0$.

The maximum of Z is therefore reached when F is taken equal to the eigenvector associated with the greatest eigenvalue of the empirical covariance matrix.

When q=1, $\hat{\Gamma}_{MV}$ is therefore the eigenvector associated with the greatest eigenvalue of the empirical covariance matrix.

The test obtained by replacing $\Gamma$ with $\hat{\Gamma}_{MV}$ in $$\sum_{n=1}^{N}\left(\sum_{p=1}^{P}|\Gamma^*z_{pn}|^2\right)$$

is the so-called GLRT (Generalized Likelihood Ratio Test) test known in the field, for example via the work "Detection, Estimation and Modulation" H. L. van Trees, Wiley 1968.

The GLRT method, which is often proposed when there is no uniformly more powerful test, is not however applicable when the parameter q is different from 1 because the likelihood ratio $$\prod_{n=1}^{N} L(z_n)$$

is a law of mixture (sum of probability densities weighted by q and 1−q), which makes its analytical resolution difficult, even impossible.

When q is different from 1, the invention proposes, as for the mono-polarization arrays, optimizing the operation of the detector in the vicinity of a signal-to-noise ratio and a coefficient q that are fixed.

For $\Gamma$, the same estimator is retained as previously and the maximum eigenvalue associated with the matrix $$\hat{R} = \frac{1}{N}\sum_{n=1}^{N}\sum_{p=1}^{P} z_{pn}z_{pn}^*$$

is taken for $\hat{\Gamma}$.

This is justified by the relationship:

$$\hat{R} = \frac{1}{N}\sum_{n=1}^{N}\sum_{p=1}^{P} z_{pn}z_{pn}^* = qR + 2\sigma^2 I$$

to which are added terms centered at $1/\sqrt{N}$

The above relationship shows that $\hat{\Gamma}$ is also a eigenvector of $\hat{R}$ associated with its greatest eigenvalue: in effect, the matrix I has the eigenvalue 1 and accepts any eigenvector, therefore any eigenvector of R (associated with the eigenvalue $\lambda$) is also a eigenvector of $\hat{R}$ (associated with the eigenvalue $q\lambda+2\sigma^2$).

This estimator is not the likelihood maximum, but it has the same properties as the likelihood maximum: it is not biased and its covariance is 1/N.

Therefore, the structure of the Neyman-Pearson test $$\sum_{n=1}^{N} \ln L(z_n) > \text{ or } < \text{threshold}$$

is used by taking as the estimator of $\Gamma$ the eigenvector of the empirical covariance matrix, associated with its greatest eigenvalue, and by choosing a point of operation for the other parameters $\sigma'^2$ and q.

The performance levels of the detector are unchanged if the test is changed to:

$$\sum_{n=1}^{N} T_q(z_n) = \sum_{n=1}^{N}(\alpha \ln L(z_n) + \beta) > \text{ or } < \text{threshold}$$

with $\alpha > 0$ and $\beta$ real.

$\alpha$ and $\beta$ are chosen such that the asymptotic behavior of the detector is that of the quadratic detector, that is to say that $$\alpha L(z_n) + \beta \approx \sum_{p=1}^{P}|\Gamma^*z_{pn}|^2/2\sigma^2 \text{ for } \sum_{p=1}^{P}|\Gamma^*z_{pn}|^2 \to \infty.$$

Furthermore, it is desirable, for any q, for $T_q(0)=0$, which means that when the measured signal is zero, it is desirable for the criterion to be zero. These two conditions dictate:

$$\begin{cases} \alpha \ln\left[q\left(\frac{4\sigma^4}{\det R}\right)^P + 1 - q\right] + \beta = 0 \\ \alpha \frac{2\sigma'^2\|G\|^2}{2\sigma'^2\|G\|^2 + 2\sigma^2} = 1 \end{cases}$$

Hence, the following is obtained:

$$\alpha = \frac{2\sigma'^2\|G\|^2 + 2\sigma^2}{2\sigma'^2\|G\|^2} \text{ and}$$

$$\beta = -\frac{2\sigma'^2\|G\|^2 + 2\sigma^2}{2\sigma'^2\|G\|^2} \ln\left[q\left(\frac{4\sigma^4}{\det R}\right)^{-P} + 1 - q\right]$$

now $\|G\| = 1$

Therefore: $\alpha = \frac{2\sigma'^2 + 2\sigma^2}{2\sigma'^2}$ and $$\beta = -\frac{2\sigma'^2 + 2\sigma^2}{2\sigma'^2} \ln\left[\frac{q(2\sigma^2)^{2P}}{(\det R)^P} + 1 - q\right]$$

With the notations defined above, the characteristic of the detector becomes:

$$T_q(Z_n) = \alpha \ln\left[\frac{q\gamma e^{Z_n/\alpha} + 1 - q}{1 + q\gamma - q}\right] \text{ with}$$

$$Z_n = \sum_{p=1}^{P}|\Gamma^*z_{pn}|^2/2\sigma^2 \text{ and } \gamma = \left(\frac{4\sigma^4}{\det R}\right)^P = \frac{1}{\left(1 + \frac{\sigma'^2}{\sigma^2}\right)^P}$$

It is proposed to approach the characteristic of the detector by two straight lines:

its asymptote at $$Z_n \to \infty : y = x + \alpha \ln\left(\frac{q\gamma}{q\gamma + 1 - q}\right)$$

the straight line: y=0 (the slope at the origin is not zero therefore this straight line is not the asymptote of $T_q$ at 0)

It therefore becomes:

$$\sum_{window} T_q(Z_n)$$

In which:

$$\begin{cases} T_q(Z_n) = 0 & \text{when } Z_n \leq s \\ T_q(Z_n) = Z_n - s & \text{when } Z_n \geq s \end{cases}$$

and in which s is defined by the point of intersection of the x-axis with the asymptote at +∞.

There now follows a description, based on the flow diagram of FIG. 1, of the steps in implementing the various embodiments of the invention.

In a first step 101, common to all the embodiments of the invention, a time-frequency transform is applied to the signals received on each antenna element of the array. More specifically, for each signal, a number of discrete Fourier transforms are applied, temporally overlapped, in order to obtain a time-frequency representation of the signal in the form of a grid of time-frequency cells each containing the spectrum of the signal for a given frequency interval and a given time interval.

There now follows a description of the sequence of the steps of the method according to a first embodiment which relates to the antenna arrays with monopolarization.

$x_{n,j}$ denotes the spectral value obtained for the time-frequency cell of index n measured for the antenna element of index j, hereinafter called "spectrum". $X_n$ denotes the vector made up of the spectra of the time-frequency cell of index n measured for all the antenna elements of the array.

In a second step 103, the quadratic sum of the spectra $x_{n,j}$ is calculated, in other words the norm squared of the vector $X_n$:

$$\|X_n\|^2 = X_n^* X_n = \sum_{j=1}^{Psensors} x_{n,j}^* x_{n,j}$$

or even the energy of the signal $X_n$.

In a third step 104, the nonlinear function $T_q$ is applied to the result of the second step 103 in order to eliminate the time-frequency cells assumed to contain only noise.

$$\begin{cases} T_q(X_n^* X_n) = 0 & \text{when } X_n^* X_n \leq s \\ T_q(X_n^* X_n) = X_n^* X_n - s & \text{when } X_n^* X_n \geq s \end{cases}$$

The threshold s is determined by searching for the intersection between the x-axis and the asymptote at infinity of the logarithm of the likelihood ratio approximated by the function $T_q$ given by the relationship (1). An expression of the value of the threshold s is given by the relationship (2).

This relationship depends on the signal-to-noise ratio and on the parameter q representative of the probability of presence of the signal in a time-frequency cell.

To calculate the threshold s, the signal-to-noise ratio is set at a given operating point, dependent notably on the targeted application.

For a signal-to-noise ratio stronger than the set operating point, the detector is mismatched but this does not pose any problem because the signal is more easy to detect than at the operating point for which the algorithm is set. For a signal-to-noise ratio lower than the set operating point, the detector is mismatched but it is considered that the corresponding signals are not of interest.

The value of the parameter q is set as close as possible to the value 0, without being zero, so as to obtain the case where the signal has a low probability of being present. The detector according to the invention is optimized for this value of q. If the real value of q is greater than the value of q chosen, the average signal-to-noise ratio $q\sigma'^2/\sigma^2$ is higher and therefore the detection threshold will be more easily crossed. If the real value of q is lower than the value of q chosen, the average signal-to-noise ratio is lower but it is considered that this situation is of no interest. In practice, a value of q equal to 0.1 can be retained because, below this value, the probability of presence of the signal is too low to constitute a realistic case.

In a fourth step 105, the result of the preceding step 104 is integrated over all of the time-frequency cells of the selected window.

Finally, in a last step 106, the result of the integration 105 is compared to a predetermined detection threshold $S_{det}$ to deduce therefrom the presence or the absence of signal.

The detection threshold $S_{det}$ is determined by trial and error so as to set a given probability of false alarm.

In a second embodiment, the detection method according to the invention can also be applied for an antenna array with bipolarization.

In this case, the method according to the invention comprises an additional step 102 which consists in calculating the empirical covariance matrix 2×2 over the P×N measurements of a window in which P is the number of antenna elements with bipolarization and N the number of time-frequency cells of the window:

$$\hat{R} = \begin{pmatrix} \sum_{n=1}^{N} \sum_{p=1}^{P} z_{1pn}^* z_{1pn} & \sum_{n=1}^{N} \sum_{p=1}^{P} z_{1pn}^* z_{2pn} \\ \sum_{n=1}^{N} \sum_{p=1}^{P} z_{2pn}^* z_{1pn} & \sum_{n=1}^{N} \sum_{p=1}^{P} z_{2pn}^* z_{2pn} \end{pmatrix}$$

Then, the eigenvector $\hat{\Gamma}$ associated with the greatest eigenvalue of $\hat{R}$ is determined. The eigenvector $\hat{\Gamma}$ can be determined, for example, by first diagonalizing the matrix $\hat{R}$.

The step 103 is then replaced by the calculation, for each time-frequency cell of index n, of the sum $$Z_n = \sum_{p=1}^{P} |\hat{\Gamma}^* z_{pn}|^2.$$

This amounts to forming the channel on which the signal-to-noise ratio is maximum.

The following steps 104,105,106 are applied in the same way as for the case of the mono-polarization array by replacing the power of the signal $X_n$ with the sum $Z_n$.

According to a variant of the second embodiment described above, one possible line for simplification consists in considering that the covariance matrix R is a diagonal matrix. This amounts to assuming that there is incoherence in the signals received, not only from one antenna element to another, but also between the two channels, polarized differently, of one and the same antenna element. The detector according to the invention then becomes quadratic in polarization and on the reception channels. This variant is applicable whether the phase centers of the two sub-arrays are collocated or not.

In this case, the step 102 becomes optional and the method is identical to the case of the array with mono-polarization by replacing, in the step 103, the power of the signal $X_n$ with that of the signal made up of the spectra $z_{pn}$ for a given time-frequency cell $$Z_n = \sum_{p=1}^{P} \|z_{pn}\|^2.$$

This variant is of interest notably when the power of the received signal is similar for the two polarizations. In this case, the invention makes it possible to transform the incoherent integration gain over the P reception channels of an array with mono-polarization into an incoherent integration gain over the 2P channels of the array with bipolarization.

One advantage of this variant is that it offers greater ease of implementation at the cost of an acceptable degradation of the sensitivity performance levels due to the fact that the integration gain in polarization is no longer a coherent integration gain.

FIGS. 2a, 2b, 3a, 3b schematically represent, on a number of block diagrams, the device for detecting electromagnetic signals according to a number of embodiments of the invention.

Figure 2A:
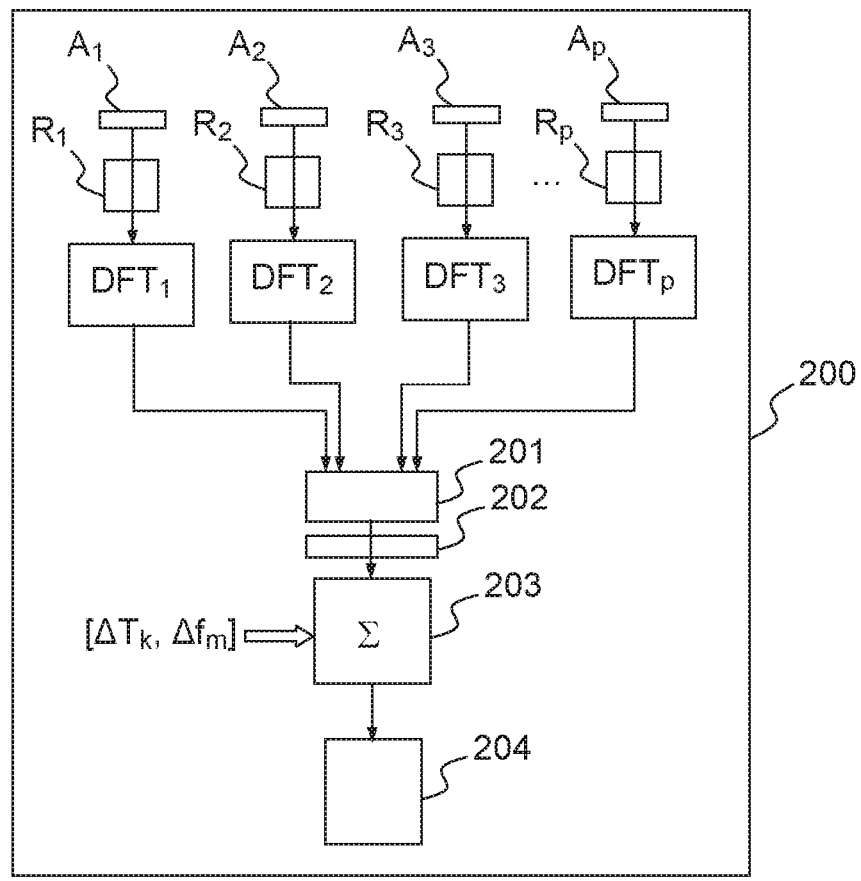

FIG. 2a describes a detection device according to a first embodiment of the invention applied to an antenna array with mono-polarization.

The device 200 described in FIG. 2a comprises an antenna array made up of a plurality of antenna elements or sensors $A_1, A_2, A_3 \ldots A_P$ with mono-polarization. Each antenna element is coupled to a reception channel $R_1, R_2, R_3 \ldots R_P$ to, notably, digitize the analog signal received by each sensor. At the output of each reception channel, a time-frequency transform $DFT_1, DFT_2, DFT_3, DFT_P$ is applied, through one or more temporally overlapped discrete Fourier transforms. For each reception channel, this operation culminates in the construction of a grid of time-frequency cells each containing the spectrum of the signal for a given time interval and a given frequency interval.

The detection device 200 also comprises a first computation module 201 to perform the quadratic sum, in each case, of the spectra at the output of each time-frequency transform. In other words, the computation module 201 is configured to execute the step 103 of the detection method according to the invention.

The detection device 200 also comprises a second computation module 202 configured to apply the step of nonlinearity 104 of the method according to the invention, a third computation module 203 to perform an integration, in accordance with the step 105 of the method according to the invention, of the output of the second module 202 over a time-frequency window $[\Delta T_k, \Delta f_m]$ which comprises a given number of time-frequency cells. Finally, a last computation module 204 is configured to compare the result of the integration carried out by the third module 203 to a predetermined detection threshold and produce information concerning the presence or the absence of signal in the time-frequency window $[\Delta T_k, \Delta f_m]$.

Figure 2B:
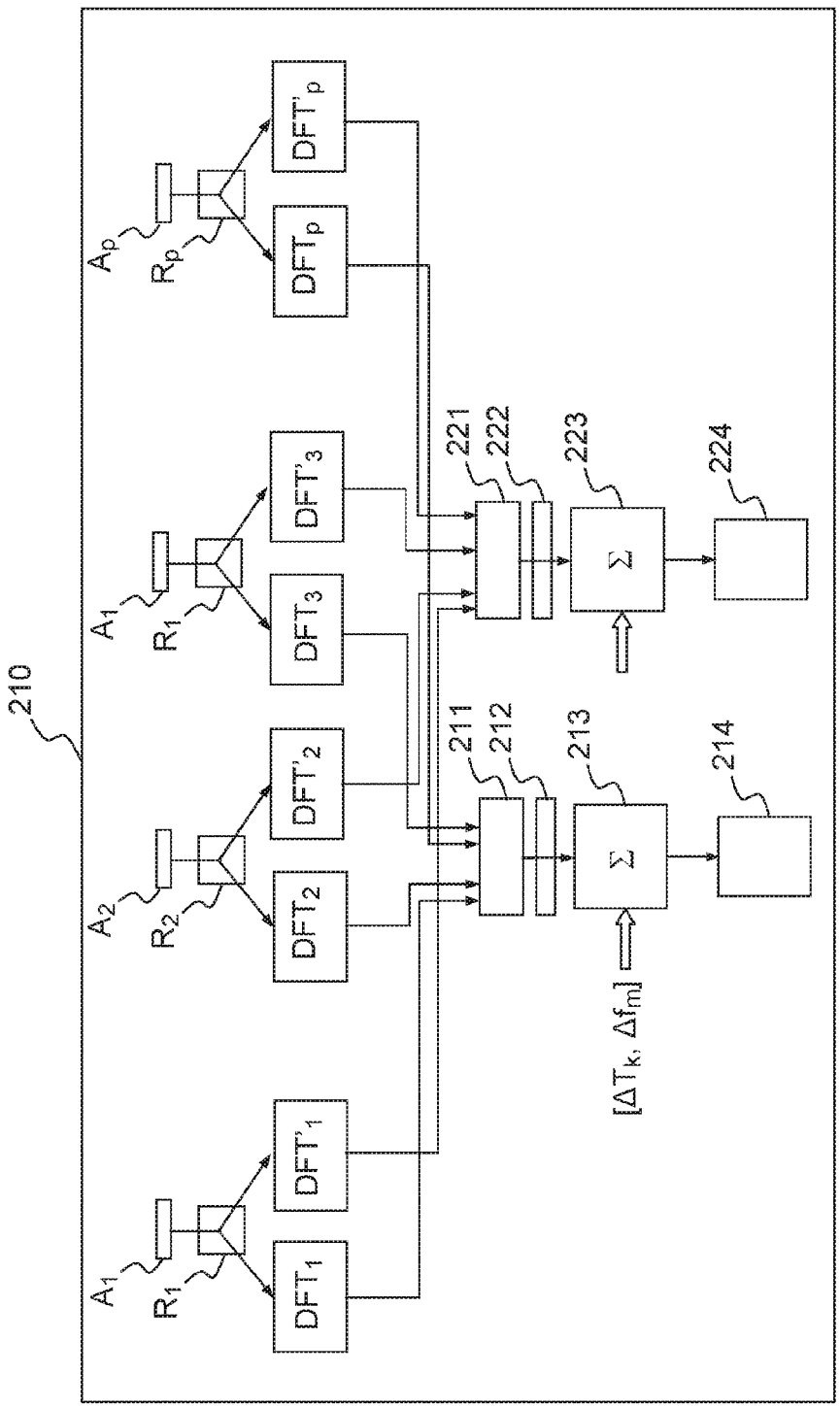

FIG. 2b schematically represents a variant of the detection device of FIG. 2a according to which, for each reception channel $R_1, R_2, R_3 \ldots R_P$, two types of discrete Fourier transforms are applied with two different frequency resolutions. In this case, the computation modules 201-204 described for FIG. 2a are duplicated for each frequency resolution. One advantage of having a number of types of discrete Fourier transforms is that this makes it possible to increase the probability of there being a filter width matched to the band of the signal to be processed.

Figure 3A:
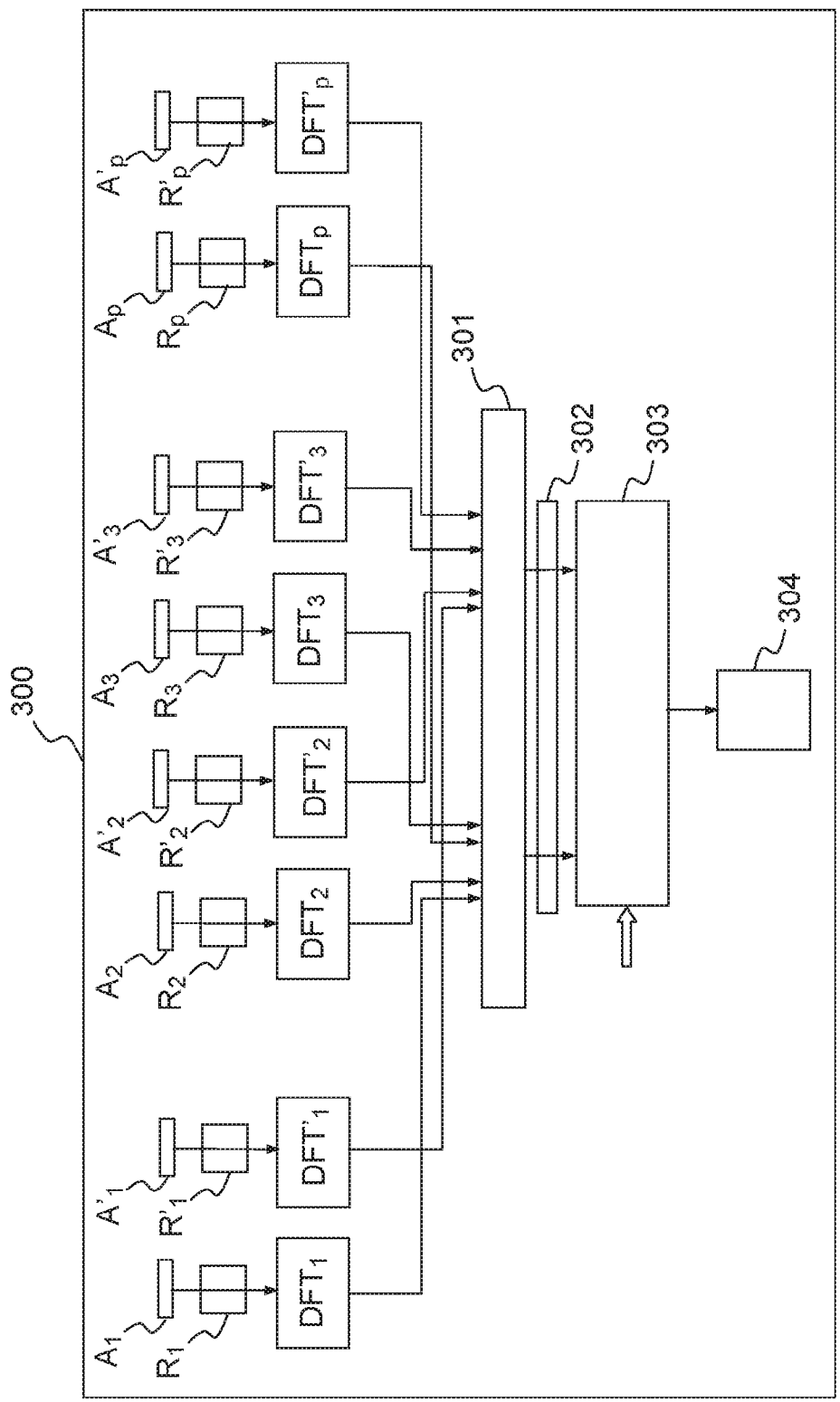

FIG. 3a represents a block diagram of a detection device 300 according to the invention applicable for an antenna array with bipolarization.

Such a device 300 comprises a plurality of antenna elements suitable for operating according to two distinct polarizations. For a given channel, an antenna element with bipolarization $A_1, A'_1$ can be made up of two distinct elements or of one single element configured to operate according to two distinct polarizations.

The device 300 comprises a reception channel $R_1$, $R'_1 \ldots R_P, R'_P$ and a time-frequency transform $DFT_1$, $DFT'_1, \ldots DFT_P, DFT'_P$ for each antenna element and each polarization.

The device 300 also comprises a number of computation modules 301,302,303,304 configured to execute the steps 102 to 106 of implementation of the method for detecting electromagnetic signals according to the invention.

Just as for the device with mono-polarization described in FIG. 2b, the device with bipolarization can also implement, for each reception channel $R_1, R_2, R_3 \ldots R_P$, two types of discrete Fourier transforms with two different frequency resolutions.

Figure 3B:
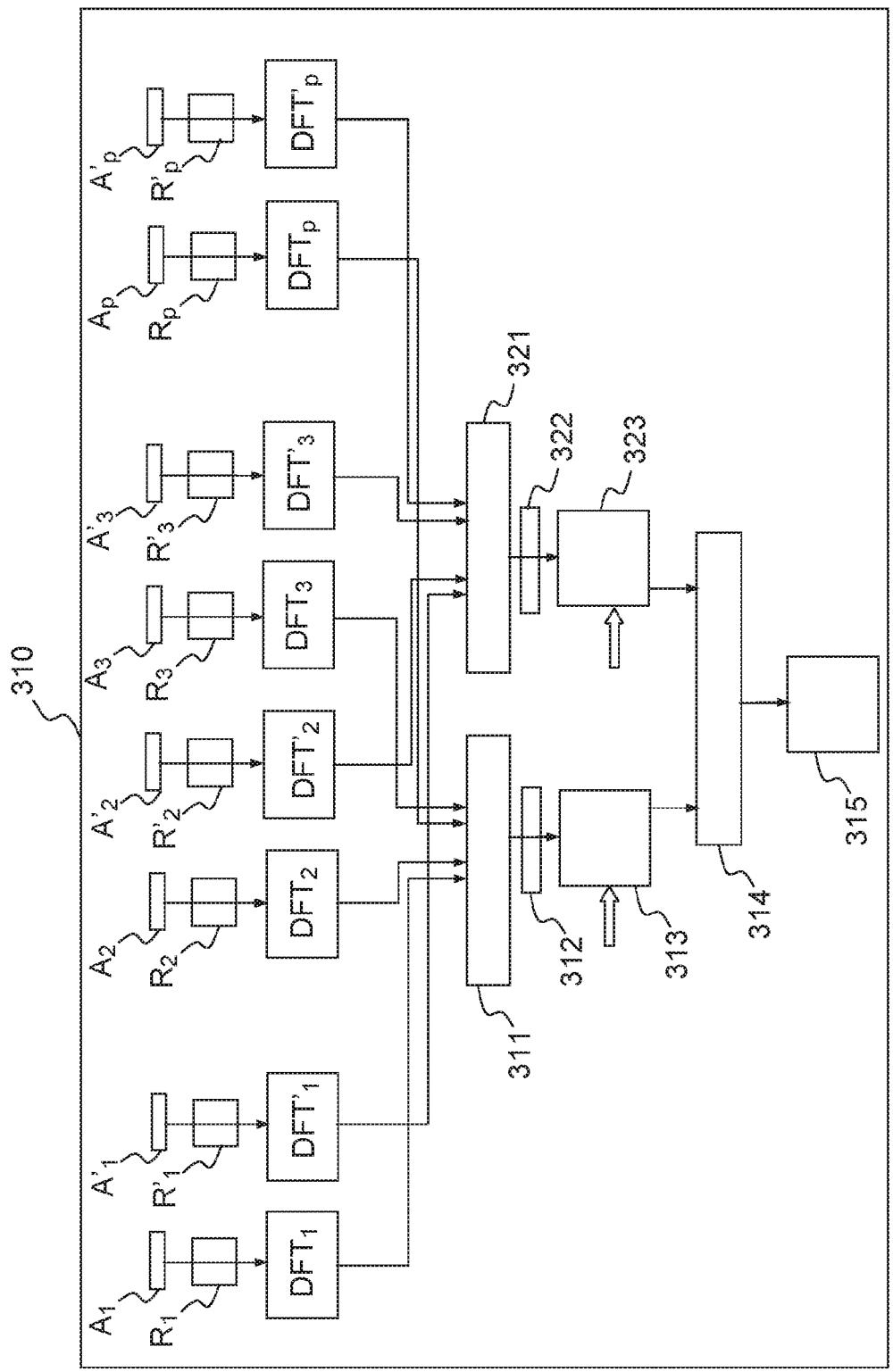

FIG. 3b represents a variant embodiment of the device of FIG. 3a, according to which each polarization is processed separately at the output of the time-frequency transforms. A first computation module 311 is configured to execute the step 103 of the method according to the invention for the signals received according to a first polarization. A second computation module 321 is configured to execute the step 103 of the method according to the invention for the signals received according to a second polarization.

A third computation module 312 is configured to execute the step 104 of nonlinearity of the method according to the invention for the signals received according to a first polarization. A fourth computation module 322 is configured to execute the step 104 of nonlinearity of the method according to the invention for the signals received according to a second polarization.

Two distinct modules 313, 323 perform the integration of the outputs of the modules 312, 322 over a given time-frequency window. An additional module 314 is used to compare the outputs of the two integrators 313, 323 and retain the output which exhibits the highest value. This latter value is compared to the detection threshold via a comparison module 315.

The variant embodiment represented in FIG. 3b is notably advantageous when the power of the signal is not balanced over the two sub-arrays each made up of antenna elements configured according to a given polarization.

This variant amounts to applying the method according to the invention, as described for the case of an array with mono-polarization, to each of the two sub-arrays operating in mono-polarization mode then to retaining only the maximum of the detection results supplied over the two sub-arrays. This variant is applicable whether the phase centers of the two sub-arrays are collocated or not.

In the different variant embodiments of the device for detecting electromagnetic signals according to the invention, the computation modules can be organized according to different architectures, in particular each step of the method can be implemented by a distinct module or, on the contrary, all of the steps can be combined within a single computation module.

Each of the computation modules that the device according to the invention comprises can be produced in software and/or hardware form. Each module can notably consist of a processor and a memory. The processor can be a generic processor, a specific processor, an application-specific integrated circuit (also known by the acronym ASIC) or a field-programmable gate array (also known by the acronym FPGA).

The invention claimed is:

1. A method for detecting an electromagnetic signal of interest contained in an electromagnetic signal received by an antenna array comprising a plurality of antenna elements, said method comprising the following steps:
applying to said electromagnetic signal received by each antenna element a plurality of time-frequency transforms in order to obtain a representation of said received electromagnetic signal in a form of a plurality of time-frequency cells each containing a spectrum of said received electromagnetic signal for a given frequency interval and a given time interval,
for each time/frequency cell of a given set of cells,
calculating an energy of a vector made up of spectra over all of the antenna elements so as to produce a plurality of spectra,
applying the following nonlinear function T to the result of the preceding energy calculation, so as to cancel the time/frequency cells containing substantially only noise:
if a norm of the energy of the vector of spectra is below a first predetermined threshold s, the result of the nonlinear function T is zero,
if the norm of the energy of the vector of the spectra is above or equal to said first predetermined threshold s, the result of the nonlinear function T is equal to the norm of the energy of the vector of spectra minus the first predetermined threshold s,
integrating, over said plurality of time/frequency cells, a result of said nonlinear function T,
comparing the result of the integration to a second predetermined threshold, called detection threshold $S_{det}$, to detect the presence of the electromagnetic signal of interest.

2. The method for detecting an electromagnetic signal of claim 1, wherein said antenna elements are mono-polarized.

3. The method for detecting an electromagnetic signal of claim 1, wherein said antenna elements are bipolarized.

4. The method for detecting an electromagnetic signal of claim 3, wherein the energy calculation step is performed on the vector made up of the spectra for each of polarizations over all of the antenna elements.

5. The method for detecting an electromagnetic signal of claim 4, also comprising:
calculating a covariance matrix between the plurality of spectra associated with the plurality of antenna elements configured according to a first polarization and the plurality of spectra associated with the plurality of antenna elements configured according to a second polarization,
calculating an eigenvector associated with a greatest eigenvalue of said covariance matrix,
in the energy calculation step, replacing the spectrum with a scalar product of the spectrum with said eigenvector.

6. The method for detecting an electromagnetic signal of claim 3, wherein the steps of calculation of the energy of the spectra, of application of the nonlinear function T and of integration, over a plurality of time/frequency cells, of the result of said nonlinear function T, are performed separately for each polarization of said antenna elements, said method further comprising an additional step of determination of the maximum of the results of integration over two polarizations, said maximum being compared to said detection threshold Sdet.

7. The method for detecting an electromagnetic signal of claim 1, wherein said first predetermined threshold s is determined by searching for an intersection between the x-axis and an asymptote at infinity of a logarithm of a likelihood ratio defined as a quotient of a probability densities in a hypothesis in which the signal of interest is present in a time/frequency cell and in hypotheses ($H_0$) in which the signal of interest is absent in a time/frequency cell.

8. The method for detecting an electromagnetic signal of claim 7, wherein said first predetermined threshold s is calculated as a function of a given signal-to-noise ratio and of a parameter q representative of the probability of presence of the signal of interest in the time/frequency cell.

9. The method for detecting an electromagnetic signal of claim 8, wherein said parameter q is chosen from a range lying between 0.1 and 1.

10. The method for detecting an electromagnetic signal of claim 1, wherein said detection threshold $S_{det}$ is configured to observe a given probability of false alarm.

11. The method for detecting an electromagnetic signal of claim 1, wherein said antenna array is lacunary.

12. A device for the detection of an electromagnetic signal of interest contained in an electromagnetic signal, said device comprising an antenna array formed by a plurality of antenna elements and a processor and a memory configured to implement a method for detecting an electromagnetic signal of interest, contained in an electromagnetic signal received by an antenna array comprising a plurality of antenna elements, said method comprising the following steps:
applying to said electromagnetic signal received by each antenna element a plurality of time-frequency transforms in order to obtain a representation of said received electromagnetic signal in a form of a plurality of time-frequency cells each containing a spectrum of said received electromagnetic signal for a given frequency interval and a given time interval,
for each time/frequency cell of a given set of cells,
calculating an energy of a vector made up of received electromagnetic signal spectra over all of the antenna elements, so as to produce a plurality of spectra,
applying the following nonlinear function T to the calculating the energy calculation, so as to cancel the time/frequency cells containing substantially only noise:

if a norm of the energy of the vector of the spectra is below a first predetermined threshold s, the result of the nonlinear function T is zero, if the norm of the energy of the vector is above or equal to said first predetermined threshold s, the result of the nonlinear function T is equal to the norm of the energy of the vector of the spectra minus the first predetermined threshold s, integrating, over said plurality of time/frequency cells, the result of said nonlinear function T, comparing the result of the integration to a second predetermined threshold, called detection threshold Sdet, to detect the presence of the electromagnetic signal of interest.

\* \* \* \* \*